UNITED STATES PATENT OFFICE.

HARRY P. BASSETT, OF CATONSVILLE, MARYLAND, ASSIGNOR TO THE SPAR CHEMICAL COMPANY, OF BALTIMORE, MARYLAND, A CORPORATION OF MARYLAND.

PROCESS OF PRODUCING POTASSIUM SALTS.

1,217,390. Specification of Letters Patent. Patented Feb. 27, 1917.

No Drawing. Application filed July 15, 1915. Serial No. 40,031.

*To all whom it may concern:*

Be it known that I, HARRY P. BASSETT, citizen of the United States, residing at Catonsville, in the county of Baltimore and State of Maryland, have invented certain new and useful Improvements in Processes of Producing Potassium Salts, of which the following is a specification.

This invention relates to the treatment of insoluble potassium containing material and particularly insoluble naturally occurring silicates, such as feldspathic rock, green sand marl, and the like, and has for its object to render the normally insoluble potassium salts contained in such materials soluble in water.

I have discovered that, by subjecting naturally occurring potassium containing silicates to the simultaneous action of heat and one or more sulfur containing alkaline earth metal salts which are intermediate between sulfids and sulfates, such for example, as alkaline earth metal sulfites, thiosulfates, acid sulfites or acid thiosulfates, I am able to render the potassium content of such material soluble in water. Salts of this character are commonly referred to as intermediate decomposition products between sulfids and sulfates and they will hereinafter be so designated.

In the practice of my process I may subject a mixture of the insoluble potassium containing material and an alkaline earth metal intermediate decomposition product of the character referred to, such as calcium sulfite, to a temperature of preferably from 900° to 1000° F. The insoluble potassium containing material should preferably be of a degree of fineness which will enable it to pass through a forty or sixty mesh sieve. If the material under treatment contains 7 per cent. of potash figured as $K_2O$, and calcium sulfite is employed as the intermediate decomposition product, I preferably mix the materials in the proportions of 10 parts by weight of the potassium containing material and approximately 12 per cent. by weight of the calcium sulfite. The heat is continued until the insoluble potassium containing silicate has been fully decomposed. In practice, I have found that this is accomplished in from 45 minutes to 1 hour. A temperature above 1000° F. may be employed without interfering with the reaction but it is disadvantageous to permit the temperature to rise materially above 1200° F.

While some measure of practical success may be obtained by the treatment described, I have found that much better results may be obtained by producing the intermediate decomposition product in contact with the potassium containing silicate, whereby the potassium containing silicate is subjected to the action of such decomposition product in a nascent state.

In treating potassium containing silicates containing 7 per cent. of potash as in the last example, I preferably mix the silicate with an alkaline earth metal sulfate, sulfuric acid, a reducing agent and water in the following approximate proportions by weight:

Insoluble silicate_____ 10 parts.
Calcium sulfate_____ 1 to 2 parts.
Carbon_____ 5 parts.
Sulfuric acid_____ 4 parts.
Water_____ 6 to 8 parts.

The mixture is furnaced at a temperature of from preferably 900° to 1000° F. until the insoluble silicate is substantially wholly decomposed, the time of the treatment being ordinarily from 45 minutes to 1 hour.

In a modified embodiment of my process, in the treatment of a similar silicate, I mix the silicate with an alkaline earth metal sulfate, sulfuric acid and iron pyrites, the materials being preferably brought together in the following approximate proportions by weight:

Insoluble silicate_____ 10 parts.
Calcium sulfate_____ 2 parts.
Sulfuric acid_____ 2 parts.
Pyrites_____ 1.5 parts.
Water_____ 6 to 8 parts.

I have found that I am able to obtain satisfactory results in the operation of my process by employing a correspondingly smaller quantity of sulfur in place of the pyrites.

While I prefer to employ calcium sulfate as the material from which to produce the intermediate decomposition product between a sulfate and a sulfid, some measure of success may be obtained by using other alkaline earth metal sulfates.

In the practice of my process a sulfuric acid salt of iron is produced and this, at a temperature of 900° F. or above, is decomposed, producing iron oxid, sulfur dioxid, and sulfur trioxid. The iron oxid by its catalytic action, transforms the sulfur dioxid into sulfur trioxid and the sulfur trioxid is absorbed in water forming sulfuric acid. In this way the sulfuric acid employed as a reagent in the process is recovered as well as the sulfuric acid resulting from the decomposition of the calcium sulfate. It will thus be apparent that the sulfuric acid employed is used again and again, the amount of sulfuric acid recovered being somewhat in excess of that employed by reason of the production of sulfuric acid from the calcium sulfate used.

In my copending application Serial No. 12,932, filed March 8, 1915, for process of producing a soluble potassium compound, I have described and claimed a process wherein a mixture of insoluble potassium silicate and an acid sulfate decomposable by heat, in the presence of water, are heated in such a manner that the sulfur trioxid produced is passed back into a portion of the mixture and is absorbed in the water. In application No. 12,932, sodium acid sulfate is employed while in the present application I employ an alkaline earth metal sulfate, namely, calcium sulfate.

While I have described in detail the preferred embodiment of my process including the preferred reagents, proportions of ingredients and details of procedure, it is to be understood that the proportions of ingredients and details of procedure may be widely varied and that known chemical equivalents of the reagents may be employed without departing from the spirit of my invention or the scope of the subjoined claims.

Having described my invention, I claim:—

1. The herein described process of producing soluble potassium salts which consists in heating to a reacting temperature an insoluble potassium containing silicate, an alkaline earth metal sulfate, a reducing agent and sulfuric acid.

2. The herein described process of producing soluble potassium salts which consists in heating to a reacting temperature an insoluble potassium containing silicate, an alkaline earth metal sulfate, sulfuric acid, a reducing agent and water.

3. The herein described process of producing soluble potassium salts which consists in heating to a reacting temperature an insoluble potassium containing silicate, calcium sulfate, sulfuric acid, water, and a reducing agent.

4. The herein described process of producing soluble potassium salts which consists in heating to a reacting temperature green sand marl or similar naturally occurring insoluble potassium containing silicate, calcium sulfate, sulfuric acid, water, and carbon in approximately the following proportions by weight: green sand marl 10 parts, calcium sulfate 1 to 2 parts, sulfuric acid 4 parts, water 6 to 8 parts, and carbon .5 parts.

In testimony whereof I affix my signature in presence of two witnesses.

HARRY P. BASSETT.

Witnesses:
 PH. H. HOFFMAN,
 SAMUEL O. SOPER.